United States Patent [19]

Vaughan

[11] 4,265,350

[45] May 5, 1981

[54] CLUTCH

[76] Inventor: Robert W. Vaughan, 1104 Rathbun Dr., Minden, La. 71055

[21] Appl. No.: 33,690

[22] Filed: Apr. 26, 1979

[51] Int. Cl.³ .............................................. F16D 11/10
[52] U.S. Cl. ..................................... 192/95; 192/67 P
[58] Field of Search .............. 192/95, 101, 67 R, 67 P

[56] References Cited

U.S. PATENT DOCUMENTS

| | | | |
|---|---|---|---|
| 2,635,727 | 4/1953 | Bitler | 192/95 X |
| 3,224,398 | 12/1965 | Greulich | 192/67 P |
| 3,251,630 | 5/1966 | Astley | 192/67 R |
| 3,385,407 | 5/1968 | Kleinhans et al. | 192/67 R |
| 3,701,404 | 10/1972 | Cassell | 192/67 P |
| 3,869,030 | 3/1975 | Masaki | 192/95 X |

*Primary Examiner*—George H. Krizmanich

[57] ABSTRACT

A clutch for engaging and disengaging rotary systems and devices such as alternators and generators, which includes a hollow engaging knob fitted with projecting engaging pins, a spindle shaft and plate mounted on a rotating shaft and cooperating with the engaging knob and engaging pins, and a drive pulley rotatably positioned on the rotating shaft and having seats for selective registration with the engaging pins. A spring is positioned in the hollow cavity of the engaging knob to facilitate biasing of the engaging pins through apertures in the spindle plate and in registration with the seats in the drive pulley when the clutch is engaged. Retraction of the engaging knob and engaging pins against the bias of the spring facilitates retraction of the pins from the pulley seats, and effects disengagement of the clutch and free rotation of the drive pulley.

10 Claims, 5 Drawing Figures

U.S. Patent  May 5, 1981  4,265,350
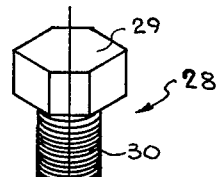
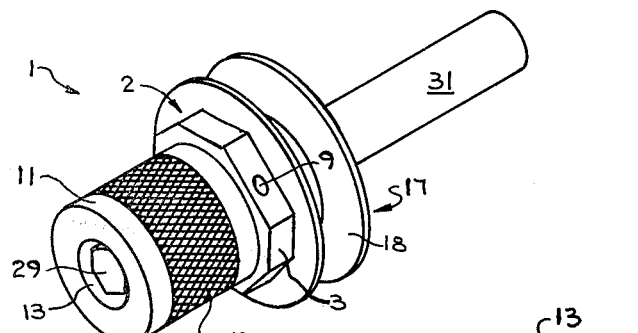
FIG. 1
FIG. 5
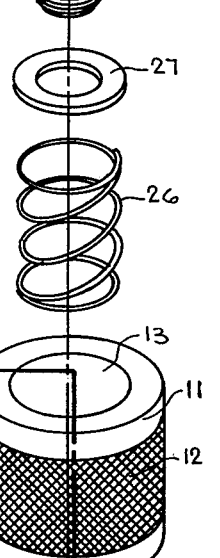
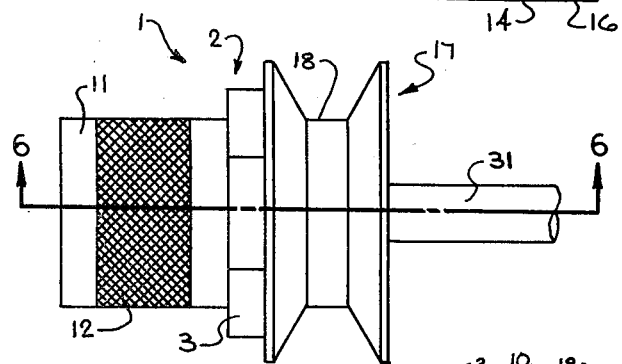
FIG. 2
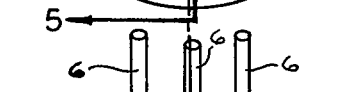
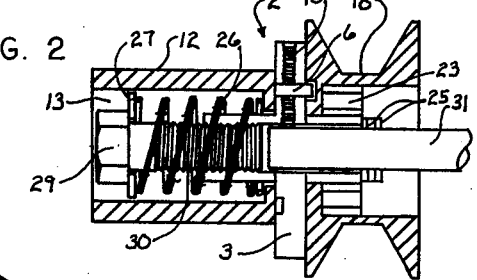
FIG. 6
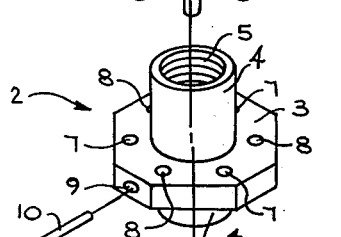
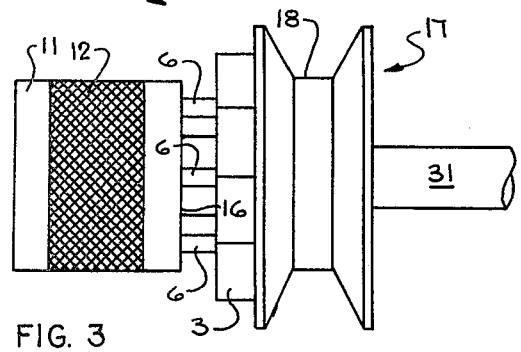
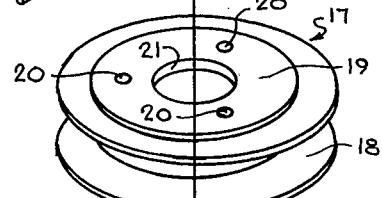
FIG. 3
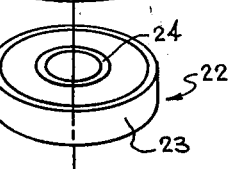
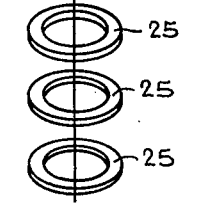
FIG. 4

CLUTCH

BACKGROUND OF THE INVENTION

1. Field of the Invention

This invention relates to a new and improved clutch, and more particularly, to a new and improved locking manual clutch which can be quickly, easily and positively engaged and disengaged. The clutch is extremely versatile since it is capable of being manufactured in a variety of sizes, and it can be adapted to substantially any power train system which is characterized by rotary motion. The clutch may be readily adapted to pumps, generators, alternators, power tools, farm equipment, engines and power take-off units of any description under circumstances where it is desired to alternately engage and disengage the rotary device upon which the clutch is mounted.

2. Description of the Prior Art

Heretofore, various clutch mechanisms having a wide variety of functions and utility have been developed to provide engagement and disengagement of drive systems in power trains of various description. Many of these mechanisms are characterized by a variety of undesirable features, among which is mechanical complexity, a feature which often necessitates frequent maintenance with accompanying high expense and inconvenience, as well as loss of time and efficiency of operation. Furthermore, such equipment is frequently too large and bulky for small unit application. Another problem sometimes found in conventional clutches is that of trueing the clutch onto the drive shaft upon which it is designed to operate to a desired degree of tolerance. This problem is magnified at high shaft speeds since any such irregularity can cause a wobble or vibration which may be detrimental to the equipment with which the clutch is designed to cooperate. Accordingly, there exists in the art today a need for a locking manual clutch which is small, compact, simple in design, easy to manipulate in engagement and disengagement, and reliable in operation.

Accordingly, it is an object of this invention to provide a new and improved locking manual clutch which is simple in design, highly reliable, characterized by minimum maintenance, and may be used in substantially any known rotary device, including generators and alternators.

Another object of this invention is to provide a clutch which is durable and compact, and which will operate over a wide range of temperatures and under adverse environmental conditions.

Still another object of this invention is to provide a locking manual clutch for engaging and disengaging rotary devices and systems which has few moving parts and is easily manipulated, and which is further characterized by simplicity of design and operation.

Yet another object of this invention is to provide a manual clutch for engaging and disengaging driven rotary power systems including generators and alternators, to facilitate a variety of useful mechanical operations, and which can be designed to operate in a corrosive environment.

A still further object of the invention is to provide a belt, gear or chain driven locking manual clutch for engaging and disengaging rotary devices and systems, including alternators and generators, which clutch is characterized by simplicity of installation and maintenance in a wide variety of applications.

Yet another object of the invention is to provide a simple locking clutch which can be selectively operated on a manual basis or provided with properly designed equipment to facilitate automatic engagement and disengagement of alternators, generators and other rotary devices.

A further object of this invention is to provide a locking manual clutch which combines the features of durability, compactness, simplicity, corrosion resistance, and which further provides a common design which is functional for engaging and disengaging large rotary systems and devices as well as small ones.

Yet another object of the invention is to provide a mechanical clutch which may be adapted for selective engagement and disengagement of chain, belt, gear or other rotary devices and systems, and which includes a pin-engaging, spring-loaded locking system which provides positive engagement and disengagement.

SUMMARY OF THE INVENTION

These and other objects of the invention are provided in a locking clutch for engaging and disengaging rotary devices and systems, including alternators and generators, which includes the following elements:

1. A spindle shaft fitted with internal threads and positioned on the drive shaft of a rotary device, and a cooperating spindle plate provided with a plurality of plate apertures and seats in alternating configuration;

2. A bearing-mounted drive pulley rotatably mounted on the drive shaft and in cooperation with one end of the spindle shaft and the spindle plate, and fitted with a plurality of spaced pulley apertures; and 3. An engaging knob having a hollow interior to accommodate the opposite end of the spindle shaft, and a plurality of projecting pins adjacent the spindle plate for selective registration with the plate seats and apertures and the pulley apertures to facilitate engagement and disengagement of the clutch.

BRIEF DESCRIPTION OF THE DRAWING

The invention will be better understood by reference to the accompanying drawing wherein:

FIG. 1 of the drawing is a perspective view of the clutch of this invention mounted on a drive shaft and illustrated in locked or engaged configuration;

FIG. 2 is a side elevation of the clutch shown in FIG. 1, with the clutch in engaged configuration;

FIG. 3 is a side elevation of the clutch illustrated in FIGS. 1 and 2, with the clutch in unlocked or disengaged configuration;

FIG. 4 is an exploded view of the clutch illustrated in FIGS. 1-3; and

FIG. 5 is a sectional view, taken along lines 5—5 in FIG. 4, more particularly illustrating a preferred internal configuration of the clutch engaging knob.

DESCRIPTION OF THE PREFERRED EMBODIMENTS

Referring now to FIGS. 1 and 4 of the drawing, the clutch of this invention is mounted for rotation on a shaft 31, which normally cooperates with a rotary device such as a generator or alternator (not illustrated), and is generally represented by reference numeral 1. Clutch 1 broadly includes a spindle 2, a cooperating engaging knob 11, and a pulley 17, the latter of which provides the drive link for clutch 1. Referring specifically to FIG. 4 of the drawing, spindle 2 is characterized by a flat spindle plate 3, welded or otherwise tightly fitted to a spindle shaft 4, which is provided with internal spindle threads 5. Spindle plate 3 may be shaped as desired, but in a preferred embodiment of the invention spindle plate 3 is shaped in a flat polygon, and in a most preferred embodiment, a hexagon or an octagon. Spindle plate 3 is provided with a retaining pin aperture 9, bored or cast transversally in the plate and extending through spindle threads 5, and a plurality of engaging pin apertures 7, which extend through spindle plate 3, are provided in spindle plate 3 in perpendicular relationship to spindle shaft 4. A plurality of engaging pin seats 8, which do not extend completely through spindle plate 3, are also provided in one face of spindle plate 3 in staggered relationship with respect to engaging pin apertures 7. The cylindrically-shaped spindle shaft 4 extends through spindle plate 3 in fixed relationship, and projects to a greater extent from the face of the plate carrying engaging pin seats 8 than from the opposite face.

Referring again to FIG. 4 and also to FIG. 5 of the drawing, the generally cylindrically-shaped engaging knob 11 is provided with an internal cavity 13 having a spindle shaft aperture 14 at one end, which aperture is defined by a cavity shoulder 15, located inside cavity 13, as shown in FIG. 5. A knurl 12 is provided on the exterior surface of engaging knob 11 to facilitate gripping and manipulation of engaging knob 11, as hereinafter described. Engaging knob 11 is also fitted with engaging pins 6, which project from engaging knob face 16, and are designed to selectively register with engaging pin apertures 7 and engaging pin seats 8 to engage and disengage clutch 1 on shaft 31, as hereinafter described.

As further illustrated in FIGS. 1 and 4 of the drawing, in a preferred embodiment of the invention pulley 17 is fitted with a belt slot 18 for attachment to a drive V-belt (not illustrated), and cooperation with a motive force such as an engine. It will be appreciated by those skilled in the art that pulley 17 may be replaced with a drive sprocket, gear drive system or alternative drive device which operates to transmit rotational power to clutch 1. In another preferred embodiment of the invention one face of pulley 17 is provided with an upward standing flange 19, and a plurality of flange apertures 20 are disposed in spaced relationship in flange 19, and coinciding with the spacing of engaging pins 6 in engaging knob face 16 of engaging knob 11. Flange 19 is also provided with a center-mounted, open flange seat 21 to provide access for the short end of spindle shaft 4, which projects from one face of spindle plate 3, as illustrated in FIG. 4. Pulley 17 is also fitted with a bearing 22, having a bearing housing 23, which is pressed tightly in the hollow interior of pulley 17. Bearing 22 is provided with a bearing race 24, disposed adjacent flange seat 21, to accommodate the short end of spindle shaft 4, as illustrated in FIG. 4 and as hereinafter described. Spacers 25, also illustrated in FIG. 4, serve to space the clutch assembly, and pulley 17 in particular, from the housing or fan of the alternator, generator or other rotary device when clutch 1 is installed on shaft 31.

Referring again to FIGS. 4 and 5, engaging knob 11 is also provided with a spring 26, which fits in cavity 13 with one end pressed against cavity shoulder 15, as is more particularly illustrated in FIG. 5. Spring 26 is biased inside cavity 13 by retaining bolt 28, which is characterized by a bolt head 29 and bolt threads 30, and a cooperating spring retainer 27, which fits concentrically on retaining bolt 28 and against bolt head 29 and one end of spring 26, as illustrated in FIG. 4.

Accordingly, referring now to FIGS. 1, 2 and 4 of the drawing, clutch 1 is assembled in locked or engaged configuration on a shaft 31 by first placing spring 26 in cavity 13 of engaging knob 11, and then inserting the long end of spindle shaft 4 into spindle shaft aperture 14 of engaging knob 11, with engaging pins 6 in registration with engaging pin apertures 7 provided in spindle plate 3. Spring 26 is thus positioned in an annulus formed by the inside wall of engaging knob 11 and the outside surface of that portion of spindle shaft 4 projecting through spindle shaft aperture 14 and into cavity 13 of engaging knob 11. Spring retainer 27 is then fitted over bolt threads 30 and against bolt head 29 of retaining bolt 28, and retaining bolt threads 30 are threaded in receiving spindle threads 5 of spindle shaft 4 against the bias of spring 26. This action forces spindle plate 3 tightly against engaging knob face 16 of engaging knob 11. Pulley 17 is then fitted to the opposite face of spindle plate 3 with the projecting end of spindle shaft 4 registering with flange seat 21 of flange 19, and resting against bearing race 24 of bearing 22. Pulley 17 is then rotated on spindle shaft 4 until engaging pins 6, extending through engaging pin apertures 7 in spindle plate 3, register with flange apertures 20 to prevent pulley 17 from rotating with respect to spindle 2 and engaging knob 11.

Thus assembled, the entire clutch assembly is mounted on a shaft 31, as illustrated in FIGS. 1 and 2, by first positioning clutch 1 and spacers 25 on the shaft in the proper location with respect to the alternator, generator or other device, and subsequently drilling a hole in shaft 31 through the existing retaining pin aperture 9 in spindle plate 3, and inserting a retaining pin 10 in retaining pin aperture 9 and the registering aperture drilled in shaft 31 to secure clutch 1 on shaft 31. Bearing 22, positioned inside pulley 17, is loosely positioned on shaft 31 to facilitate rotation of shaft 31 without rotation of pulley 17 when clutch 1 is disengaged.

Referring again to FIG. 2 of the drawing, the clutch 1 of this invention is illustrated in locked or engaged configuration as assembled on shaft 31, and while so engaged, the entire clutch assembly is locked onto shaft 31, and power can be transmitted from an engine or power source to pulley 17 by means of a V-belt, and thus to shaft 31. Referring now to FIG. 3, when it is desired to disengage or unlock clutch 1, engaging knob 11 is grasped, pulled rearwardly against the bias of spring 26 to remove engaging pins 6 from flange apertures 20 and engaging pin apertures 7, and rotated to reposition engaging pins 6 in engaging pin seats 8. This action frees pulley 17 from engaging pins 6 and spindle plate 3, and permits pulley 17 to freely turn on bearing 22, and shaft 31, thereby disengaging clutch 1.

It will be appreciated by those skilled in the art that the clutch of this invention is capable of being scaled to and adapted for operation on substantially any rotary device or system regardless of size or complexity. The clutch can be utilized with a pulley and belt drive system, as illustrated, or the power transmission can be effected by a gear system, or by means of a chain and sprocket drive with the clutch sprocket or gear designed to cooperate with the spindle and engaging knob in the same manner as the pulley 17, described above. Furthermore, suitable means can be provided according to the knowledge of those skilled in the art to automate the engaging and disengaging function of the clutch of this invention.

Having described my invention with the particularity set forth above, what is claimed is:

1. A clutch comprising:
   (a) a spindle mounted on a rotating shaft and characterized by a generally flat plate provided with at least one aperture extending through said plate and at least one seat provided in one face of said plate, and a spindle shaft extending through said plate in fixed relationship with a long segment of said spindle shaft projecting from one face of said plate and a short segment of said spindle shaft projecting from the opposite face of said plate;
   (b) a generally cylindrically-shaped engaging knob having a hollow interior and a spindle shaft aperture at one end to receive said long segment of said spindle shaft in concentric, rotatable relationship;
   (c) at least one engaging pin carried by said one end of said engaging knob and adapted to selectively register with said at least one aperture and said at least one seat in said plate upon rotational manipulation of said engaging knob with respect to said plate;
   (d) bias means in said hollow interior of said engaging knob and cooperating with said long segment of said spindle shaft to bias said spindle against said engaging knob; and
   (e) power transmitting means journalled for rotation on said rotating shaft and cooperating with said short segment of said spindle shaft and said engaging pins for selectively transmitting power to said shaft responsive to manipulation of said engaging pins in said at least one aperture and said at least one seat.

2. The clutch of claim 1 further comprising a retaining bolt threadably cooperating with said long segment of said spindle shaft in said hollow interior of said engaging knob, and wherein said bias means is a spring fitted over said retaining bolt and biasing said spindle against said engaging knob.

3. The clutch of claim 1 wherein said power transmitting means is a V-belt pulley provided with at least one pulley aperture for registering with said at least one engaging pin and locking said pulley to said spindle, and a bearing carried by said pulley.

4. The clutch of claim 1 further comprising a retaining bolt threadably cooperating with said long segment of said spindle shaft in said hollow interior of said engaging knob, and wherein:
   (a) said bias means is a spring fitted over said retaining bolt and biasing said spindle against said engaging knob; and
   (b) said power transmitting means is a V-belt pulley provided with at least one pulley aperture for registering with said at least one engaging pin and locking said pulley to said spindle, and a bearing carried by said pulley.

5. The clutch of claim 1 wherein said at least one aperture is a plurality of apertures, and said at least one seat is a plurality of seats, said seats being positioned in said plate in alternating sequence with respect to said apertures.

6. The clutch of claim 1 wherein said at least one engaging pin is a plurality of engaging pins projecting in spaced relationship from said one end of said engaging knob.

7. The clutch of claim 4 wherein said at least one pulley aperture is a plurality of pulley apertures provided in spaced relationship in one face of said pulley.

8. The clutch of claim 4 wherein:
   (a) said at least one aperture is a plurality of apertures, and said at least one seat is a plurality of seats, said seats being positioned in said plate in alternating sequence with respect to said apertures;
   (b) said at least one engaging pin is a plurality of engaging pins projecting in spaced relationship from said one end of said engaging knob for selective registration with said plurality of apertures and engagement with said plurality of seats; and
   (c) said at least one pulley aperture is a plurality of pulley apertures provided in spaced relationship in one face of said pulley for selective registration with said engaging pins.

9. The clutch of claim 1 wherein said power transmitting means is selected from the group, gears, pulleys and sprockets.

10. The clutch of claim 1 further comprising a retaining pin aperture in said plate and a shaft aperture in said shaft, said shaft aperture registering with said retaining pin aperture, and a retaining pin in registration with said retaining pin aperture and said shaft aperture for securing said spindle to said shaft.

* * * * *